(12) United States Patent
Vega (10) Patent No.: US 9,761,401 B1
(45) Date of Patent: Sep. 12, 2017

(54) HOLD-DOWN RELEASE APPARATUS AND METHODS INCORPORATING A FUSE WIRE

(71) Applicant: Glenair, Inc., Glendale, CA (US)

(72) Inventor: Edwin E. Vega, Chatsworth, CA (US)

(73) Assignee: Glenair, Inc., Glendale, CA (US)

( * ) Notice: Subject to any disclaimer, the term of this patent is extended or adjusted under 35 U.S.C. 154(b) by 0 days.

(21) Appl. No.: 15/249,351

(22) Filed: Aug. 27, 2016

(51) Int. Cl.
  *H01H 85/08* (2006.01)
  *H01H 85/36* (2006.01)
  *H01H 85/00* (2006.01)
  *H01H 85/06* (2006.01)
  *H01H 69/02* (2006.01)

(52) U.S. Cl.
  CPC ........ *H01H 85/0039* (2013.01); *H01H 69/02* (2013.01); *H01H 85/06* (2013.01); *H01H 85/08* (2013.01); *H01H 85/36* (2013.01); *H01H 2235/01* (2013.01)

(58) Field of Classification Search
  CPC .... H01H 85/0039; H01H 85/00; H01H 85/36; H01H 85/06; H01H 69/02; H01H 85/08; H01H 2235/01
  USPC .......................................... 337/142, 154, 244
  See application file for complete search history.

(56) References Cited

U.S. PATENT DOCUMENTS

| | | | | |
|---|---|---|---|---|
| 2,797,279 A | * | 6/1957 | Brandt | H01H 69/02 337/244 |
| 2,914,636 A | * | 11/1959 | Kozacka | H01H 85/303 337/158 |
| 3,179,774 A | * | 4/1965 | Swain | H01H 85/303 337/231 |
| 3,319,027 A | * | 5/1967 | Hitchcock | H01H 85/0452 29/623 |
| 3,657,679 A | * | 4/1972 | Wilson | H01H 85/303 337/158 |
| 3,783,428 A | * | 1/1974 | Swain | H01H 85/303 337/148 |
| 5,471,888 A | * | 12/1995 | McCormick | A62C 37/10 137/76 |

(Continued)

OTHER PUBLICATIONS

Thurn et al; A Nichrome Burn Wire Release Mechanism for CubeSats; 41st Aerospace Mechanisms Symposium; JPL May 16-18, 2012.

(Continued)

*Primary Examiner* — Anatoly Vortman
(74) *Attorney, Agent, or Firm* — David S. Alavi (57) ABSTRACT

A hold-down release apparatus includes a housing, a reciprocating retention member, a release member, bias member(s), and a fuse wire. The retention member moves between retention and release positions and is biased toward the release position. With the retention member in the release position, the release member can move out of the housing; with the retention member in the retention position, the retention member obstructs the release member from moving out of the housing. The fuse wire obstructs movement of the retention member to the release position and holds the retention member in the retention position against the bias force. With an actuation current flowing through the fuse wire, the bias force breaks the fuse wire, allowing the retention member to move to the release position in response to the bias force, and the release member to move out of the housing.

23 Claims, 4 Drawing Sheets

(56) References Cited

U.S. PATENT DOCUMENTS

| | | | | |
|---|---|---|---|---|
| 5,606,889 | A * | 3/1997 | Bielinski | G05G 17/00 137/76 |
| 5,621,373 | A * | 4/1997 | McCormick | A62C 37/12 137/76 |
| 5,771,742 | A * | 6/1998 | Bokaie | B64G 1/22 337/140 |
| 5,886,613 | A * | 3/1999 | Magoon | H01H 85/303 337/241 |
| 6,133,818 | A * | 10/2000 | Hsieh | B64G 1/222 337/1 |
| 6,249,063 | B1 | 6/2001 | Rudoy et al. | |
| 6,269,748 | B1 | 8/2001 | Rudoy et al. | |
| 6,371,777 | B1 | 4/2002 | Rudoy et al. | |
| 6,433,990 | B1 | 8/2002 | Rudoy et al. | |
| 6,525,920 | B2 | 2/2003 | Rudoy et al. | |
| 6,747,541 | B1 * | 6/2004 | Holt | B64G 1/645 337/1 |
| 7,396,182 | B2 * | 7/2008 | Retat | B64G 1/222 337/150 |
| 8,021,069 | B2 * | 9/2011 | Baghdasarian | B64G 1/645 337/401 |
| 8,568,053 | B2 * | 10/2013 | Baghdasarian | B64G 1/222 403/2 |
| 8,904,781 | B2 * | 12/2014 | Buttolph | F03G 7/065 337/1 |
| 8,904,889 | B2 * | 12/2014 | Rudoy | B64G 1/222 337/401 |
| 9,085,377 | B2 * | 7/2015 | Baghdasarian | B64G 1/222 |
| 2002/0080547 | A1 * | 6/2002 | Rudoy | B64G 1/222 361/161 |

OTHER PUBLICATIONS

Co-owned U.S. Appl. No. 15/279,501 filed Sep. 29, 2016 in the name of Vega.
Co-owned U.S. Appl. No. 15/279,515 filed Sep. 29, 2016 in the name of Vega.

* cited by examiner

HOLD-DOWN RELEASE APPARATUS AND METHODS INCORPORATING A FUSE WIRE

FIELD OF THE INVENTION

The field of the present invention relates to hold-down release mechanisms. In particular, hold-down release apparatus and methods are disclosed that incorporate a fuse wire.

SUMMARY

A hold-down release apparatus comprises a housing, a reciprocating retention member, a release member, one or more bias members, and a fuse wire. The retention member is (i) moveable by reciprocating motion within the housing between a retention position and a release position and (ii) biased toward the release position by a bias force exerted by the one or more bias members. With the retention member in the release position, the release member is moveable from a retained position at least partly within the housing to an exterior space outside the housing. With the retention member in the retention position, the retention member obstructs movement of the release member from the retained position to the exterior space. The fuse wire is arranged so as to (i) obstruct movement of the retention member from the retention position to the release position and (ii) hold the retention member in the retention position against the bias force. With an electrical actuation current flowing through the fuse wire, the bias force is sufficient to break the fuse wire, thereby enabling (i) movement of the retention member to the release position in response to the bias force and (ii) movement of the release member from the retained position to the exterior space.

The release apparatus can be employed to attach a deployable component to a satellite. The housing can be attached to the body of the satellite, and the release member can be attached to the deployable component of the satellite. With the release member held in the retained position by the retention member in the retention position, the release member holds the deployable component in a non-deployed arrangement. With the retention member in the release position, movement of the release member from the retained position to the exterior space enables movement of the deployed component from the non-deployed arrangement into a deployed arrangement. The satellite can be a CubeSat unit; the housing can occupy less than about 4 cm$^3$.

Objects and advantages pertaining to hold-down release mechanisms may become apparent upon referring to the example embodiments illustrated in the drawings and disclosed in the following written description or appended claims, and shall fall within the scope of the present disclosure or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically: all features may not be shown in full detail or in proper proportion, certain features or structures may be exaggerated relative to others for clarity, and the drawings should not be regarded as being to scale. The terms top, side, bottom, and so forth are relative terms only, and do not indicate absolute directions or orientation. The embodiments shown are only examples: they should not be construed as limiting the scope of the present disclosure or appended claims.

DETAILED DESCRIPTION OF EMBODIMENTS

Figure 1A:
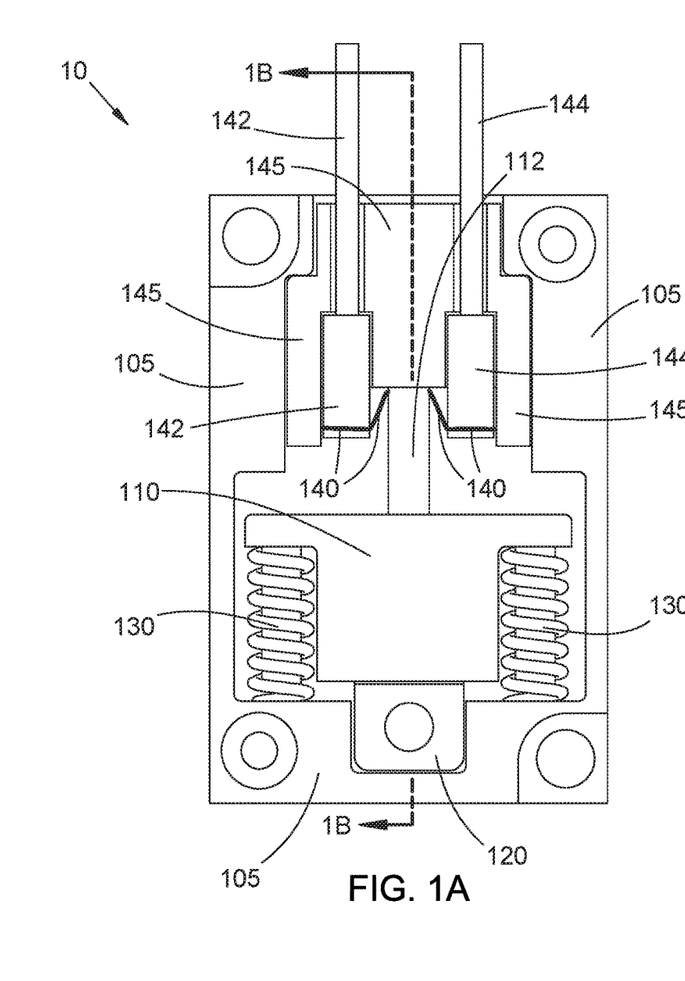
FIG. 1A is a top view, with a top cover of a housing removed, of an example inventive release apparatus with a retention member in a retention position and with a release member in a retained position within the housing.

FIGS. 1A/1B/1C and 2A/2B/2C illustrate schematically an example of a hold-down release apparatus 10. The release apparatus 10 includes a housing 105, a reciprocating retention member 110, a release member 120, one or more bias members 130, and a fuse wire 140. The retention member 110 is (i) moveable by reciprocating motion within the housing 105 between a retention position and a release position, and (ii) biased toward the release position by a bias force exerted by the one or more bias members 130. With the retention member 110 in the release position (as in FIGS. 2A/2B/2C), the release member 120 is moveable from a retained position at least partly within the housing 105 (as in FIG. 2B) to an exterior space outside the housing 105 (as in FIG. 2C). With the retention member 110 in the retention position (as in FIGS. 1A/1B), the retention member 110 obstructs movement of the release member 120 from the retained position to the exterior space. The housing 105 (in some examples including a removable cover 106), the retention member 110, and the release member 120 can be made from any suitably strong and rigid one or more materials, including one or more metals, alloys, plastics or resins, composite materials, and so forth. In some examples the housing 105 (and cover 16, if present), retention member 110, and release member 120 can all be made of the same one or more materials; in other examples, each can be made from one or more materials different from those of another. In some examples, those elements are all made from nickel-plated aluminum.

The housing 105 and the retention member 110 can be arranged or structurally adapted in any suitable way to enable the reciprocating motion of the retention member 110 within the housing 105. Examples can include rails, slots, ridges, channels, bearings, guide rods, or other suitable structural elements for engaging the retention member 110 within the housing 105 and allowing the required reciprocating motion. In some examples (including the example shown in the drawings), simply enclosing the retention member 110 within the housing 105 (including a cover 106 in the example shown; FIGS. 1B, 2B, 2C, and 3B) can constrain the motion of the retention member 110 within the housing 105. In some examples (including the example shown) a channel can be arranged to receive a portion of the retention member 110 to constrain or guide the reciprocating motion of the retention member 110 (e.g., a channel 147 in an insert 145 arranged to receive a protruding portion 112 of the retention member 110; see below). In some examples, including the example shown, the reciprocating motion of the retention member 110 is substantially perpendicular to movement of the release member 120 as its leaves its retained position at least partly within the housing 105 and moves out of the housing 105 and into the surrounding exterior space. That arrangement can reduce or eliminate additional force on the fuse wire 140 that might arise from a load on the release member 120.

Figure 3A:
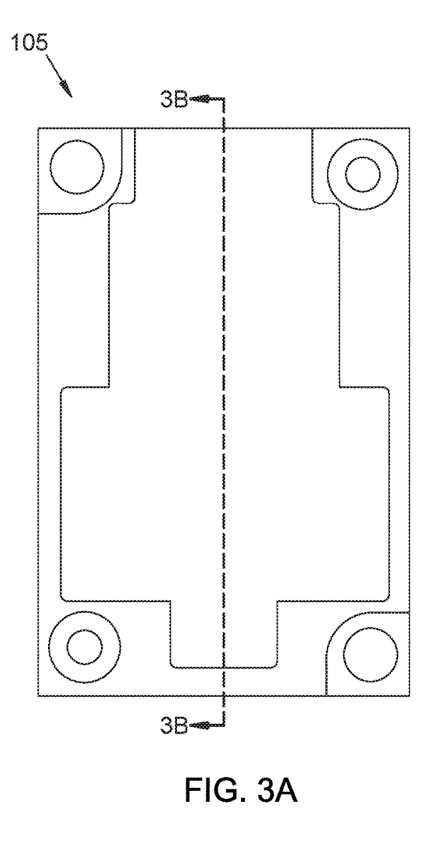
FIGS. 3A and 3B are top and side cross-sectional views, respectively, of the housing.
Figures 3B, 4A, 4B, 5A, 5B, 6A, 6B:
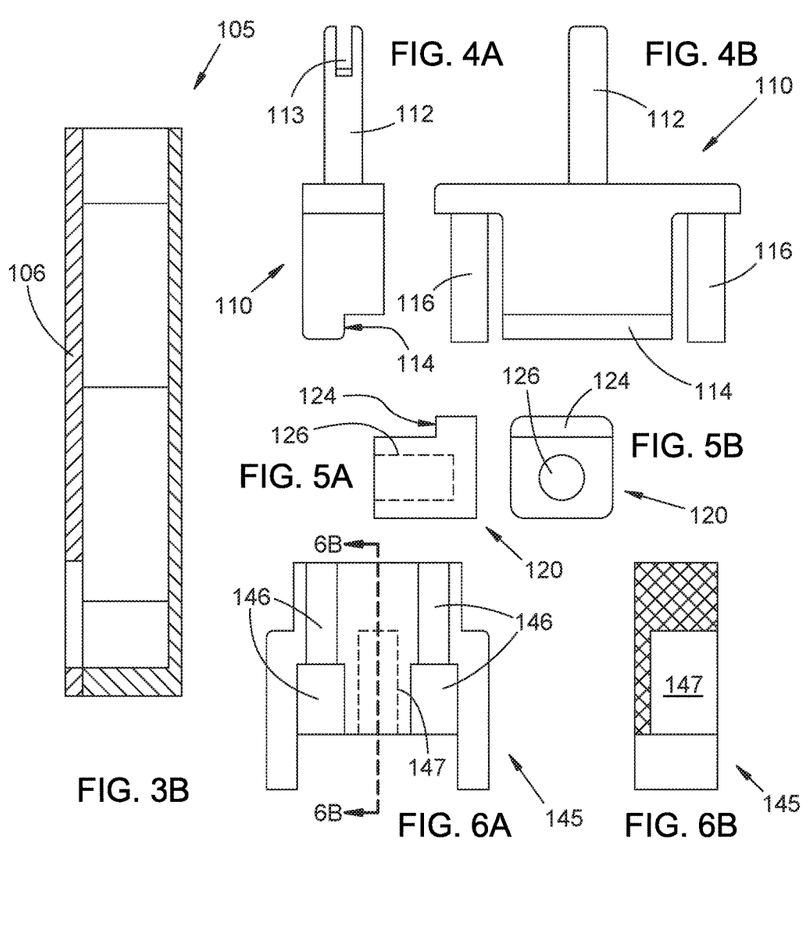
FIGS. 4A and 4B are side and bottom views, respectively, of the retention member. The spring guide rods are omitted from the side view for clarity.
FIGS. 5A and 5B are side and top views, respectively, of the release member.
FIGS. 6A and 6B are top and side cross-sectional views, respectively, of an insulating insert.

The retention member 110 and the release member 120 can be arranged in any suitable way so that, with the retention member 110 in the retention position and the release member 120 in the retained position, the retention member 110 obstructs movement of the release member 120 from the retained position out of the housing 105. In the example shown, that obstruction is provided by engagement surfaces 114 and 124 on the retention member 110 and the release member 120, respectively (FIGS. 4A/4B and 5A/5B). With the retention member 110 in the retention position, the engagement surface 114 of the retention member 110 is positioned against the engagement surface 124 of the release member 120. The contact of those engagement surfaces 114/124 obstructs movement of the release member 120 from the retained position within the housing 105 to the exterior space (as in FIG. 1B). Movement of the retention member 110 to the release position causes the engagement surfaces 114/124 to slide across one another. In some examples, to limit frictional resistance to such movement, the coefficient of static friction between the engagement surfaces 114/124 is less than about 0.10. A suitably low friction coefficient can be provided in any suitable way, such as a coating or surface treatment of one or both surfaces 114/124, or application of a wet or dry lubricating agent (e.g., Dicronite® dry lubricating agent). In the example shown, the engagement surfaces 114/124 are substantially perpendicular to the direction of movement of the release member 120 as its leaves the housing 105. Those engaged surface 114/124 therefore bear any perpendicular load forces on the release member 120; parallel load forces on the release member 120 can be borne by the housing 105 (including the cover portion 106, if present). The fuse wire 140 is thus substantially protected from load forces on the release member 120, and for the most part bears only the bias force exerted on the retention member 110 by the one or more bias members 130.

Load forces on the release member 120 arise primarily from whatever object or component is attached to it, to be held down by the release apparatus 10 but then released on command. Such load forces can arise from the weight or inertia of the attached object, or from a bias force applied by or to the attached object to facilitate or propel its release (discussed further below). The release member 120 can be arranged or structurally adapted in any suitable way to allow attachment of an object or component to be released. In the example shown, a threaded hole 126 enables attachment of the object or component.

The one or more bias members 130 can be of any suitable number, type, or arrangement. In many examples, the one or more bias members 130 include one or more springs (coil, leaf, flat, machined, serpentine, and so on; tension, compression, torsion, or other; made of one or more elastically deformable materials, often metal or alloy). In the example shown, a pair of metal coil compression springs 130 are arranged to push the retention member 110 toward the release position. The coil springs 130 in the example shown are arranged around guide members 116 (e.g., rods or pins) attached to the retention member 110; other arrangements of such guide members 116 (e.g., attached to the housing 105) can be employed, or in some examples no such guide members are employed. With the retention member 110 in the release position, the springs 130 can be at their rest length, but more typically would be under some degree of compression to ensure an adequate range of motion of the retention member 110. With the retention member in the retention position, the springs 130 are compressed to a greater degree and apply the bias force to the retention member 110 that urges it toward the release position. For any given release apparatus 10, the one or more bias members are arranged so as to provide a sufficient range of motion of the retention member 110, and to provide a bias force that is (i) small enough for the fuse wire 140 to hold the retention member 110 in the retention position when no current flows through the fuse wire 140, but (ii) large enough to break the fuse wire 140 when the electrical actuation current flows through the fuse wire 140 and propel the retention member 110 to the release position. The range of suitable bias force of course depends on the particular arrangement and loads on a given release apparatus 10. In some examples the actuation current would cause breakage of the fuse wire 104 even without any bias force applied. In such examples, some bias force is still needed to overcome friction between the engaged retention member 110 and release member 120, and to ensure adequate movement of the retention member 110 away from the retention position and to the release position.

Figures 1B, 1C:
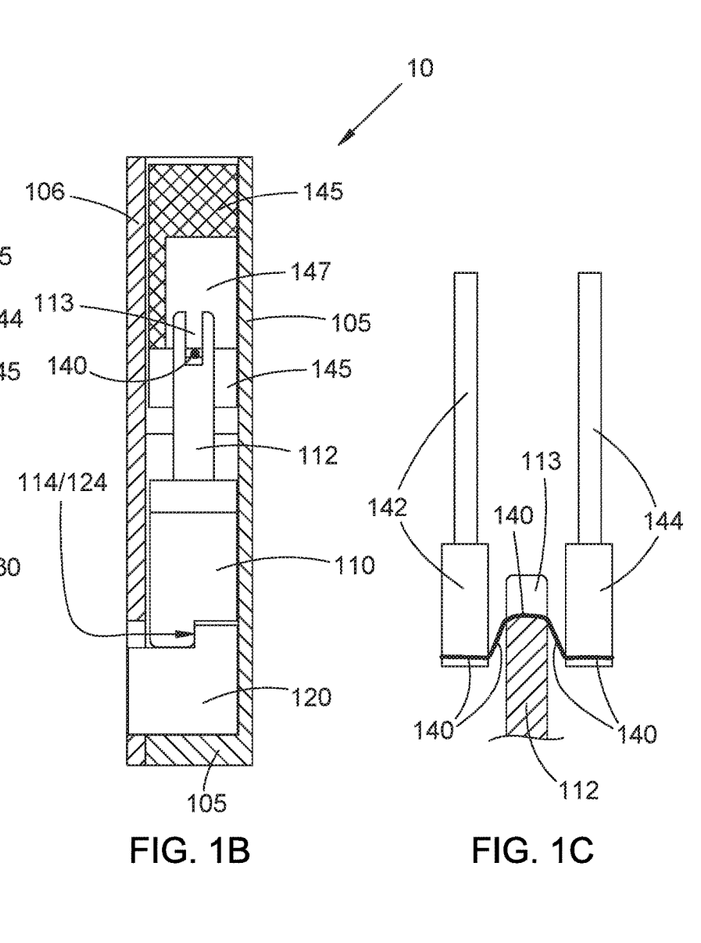
FIG. 1B is a partial side cross-sectional view, with the cover in place, of the example inventive release apparatus with the retention member in the retention position and with the release member in the retained position.
FIG. 1C illustrates schematically a fuse wire attached to two electrical conductors and engaged with the retention member.
Figures 2A, 2B:
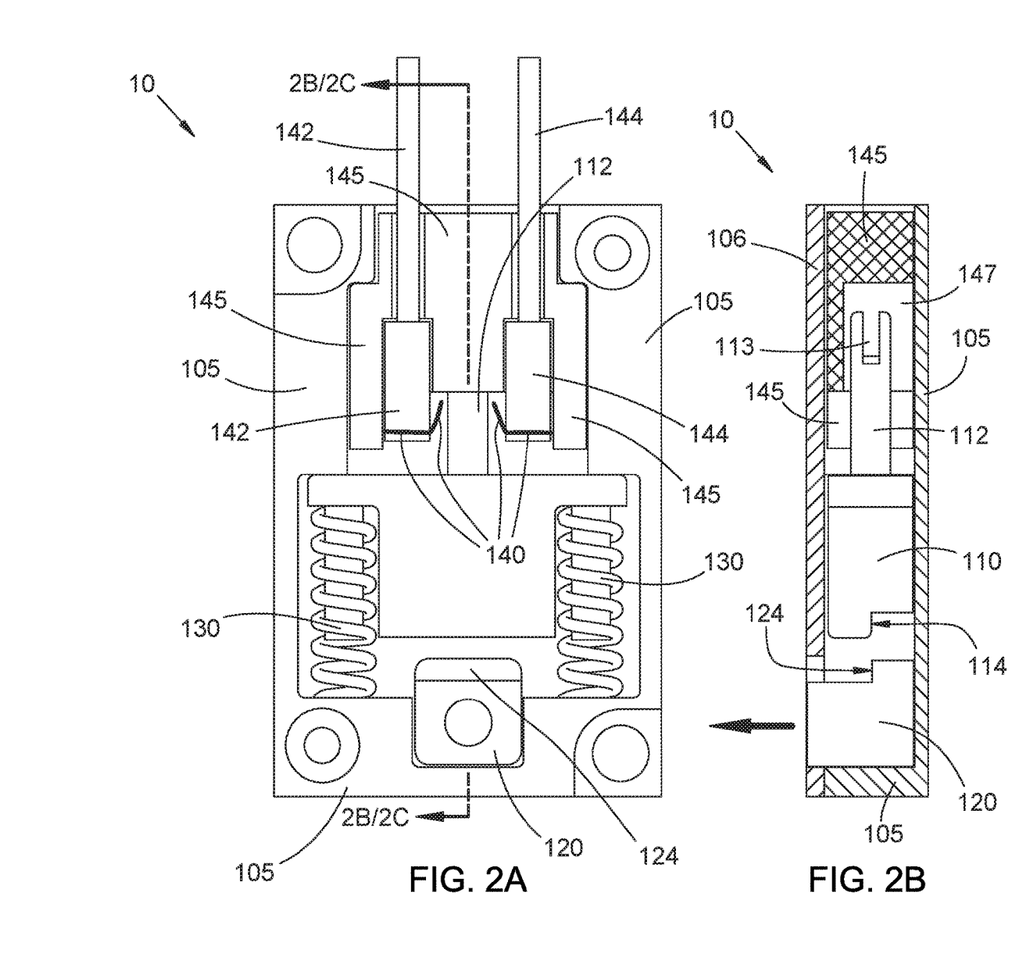
FIG. 2A is a top view, with the top cover removed, of the example inventive release apparatus with the retention member in a release position.
FIG. 2B is a partial side cross-sectional view, with the cover in place, of the example inventive release apparatus with the retention member in the release position and with the release member in the retained position.
Figure 2C:
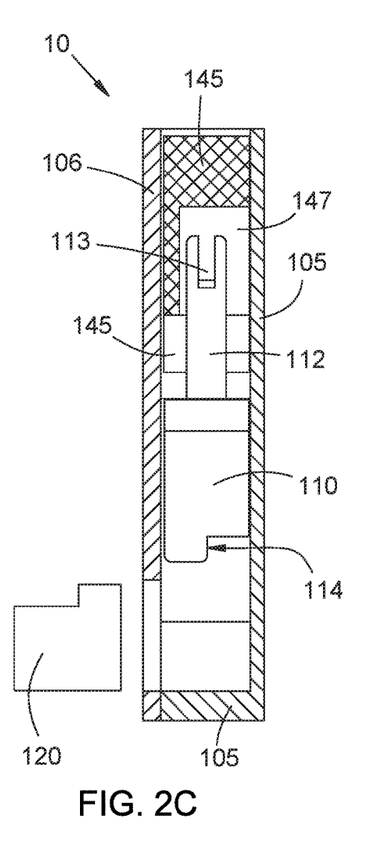
FIG. 2C is a partial side cross-sectional view, with the cover in place, of the example inventive release apparatus with the retention member in the release position and with the release member outside of the housing.

The fuse wire 140 is arranged (as in FIGS. 1A/1B/1C) so as to (i) obstruct movement of the retention member 110 from the retention position to the release position and (ii) hold the retention member 110 in the retention position against the bias force. With an electrical actuation current flowing through the fuse wire 140, the bias force is sufficient to break the fuse wire 140 (in some instances, the actuation current may cause the fuse wire 140 to break even without any applied bias force). Breakage of the fuse wire 140 enables (i) movement of the retention member 110 to the release position in response to the bias force, and (ii) movement of the release member 120 from the retained position out of the housing 105 to the exterior space. In some examples, a stainless steel fuse wire is employed; other suitable fuse wire materials can be employed within the scope of the present disclosure or appended claims. The magnitude of the electrical actuation current required to activate the release apparatus (by causing the fuse wire 140 to break) depends on primarily on the material and thickness of the fuse wire 140, and can to some degree also depend on the magnitude of the bias force.

A first end of the fuse wire 140 is connected to a first electrical conductor 142 (e.g., an insulated wire) that is in turn connected to a source (not shown) of the electrical actuation current. The first electrical conductor 142 is insulated electrically from the housing 105. With the retention member 110 held in the retention position by the fuse wire 140, the fuse wire 140 is electrically insulated from the retention member 110, or contacts only an electrically insulated portion of the retention member 110. In the example shown, a protruding portion 112 of the retention member 110 is made of plastic or other insulating material, and is the only portion of the retention member 110 that makes direct contact with the fuse wire 140. Other suitable arrangements for insulating the fuse wire 140 from the retention member 110 can be employed and fall within the scope of the present disclosure or appended claims.

If the housing 105 is grounded, the second end of the fuse wire 140 can be connected to the housing 105, and the electrical actuation current can flow through the first conductor 142, through the fuse wire 140, and through the housing 105. More typically, the second end of the fuse wire 140 is connected to a second electrical conductor 144 (e.g., a second insulated wire) that is in turn connected to the source of the electrical actuation current. The second electrical conductor 144 (and the fuse wire 140 along with it) is electrically insulated from the housing 105. In the example shown, an electrically insulating insert 145 (FIGS. 6A/6B) is positioned within the housing 105. The insert 145 is arranged to hold the first and second electrical conductors 142/144 in their respective positions within the housing 105 in corresponding groove or slots 146, and to thereby also hold the fuse wire 140 within the housing 105. The insert 145 electrically insulates the first and second electrical conductors 142/144 and the fuse wire 140 from the housing 105. Any suitably rigid plastic or other insulating material can be employed to form the insert 145.

The fuse wire 140 can be attached to the conductors 142/144 in any suitable way that provides the required electrical continuity as well as the required strength to hold that the fuse wire 140 in place, attached to the conductors 142/144, against the bias force. In some examples, the first end of the fuse wire 140 is wound around a contact portion of the first electrical conductor 142 and welded or soldered to the contact portion, while the second end of the fuse wire 140 is wound around a contact portion of the second electrical conductor 144 and welded or soldered to the contact portion. In some examples, only a single winding of the fuse wire 140 around each contact in employed. In some examples, resistance welding is employed to attach a stainless steel fuse wire 140 to gold-plated contact portions of the conductors 142/144.

In some examples, with the retention member 110 held in the retention position by the fuse wire 140, the fuse wire 140 is arranged in a "U" shape (FIGS. 1A/1B/1C). In such examples, a protruding portion of the retention member 110 can extend between opposite side portions of the U-shaped fuse wire, and an end of the protruding portion can be positioned against a central portion of the U-shaped fuse wire 140. Such an arrangement is shown in the examples in the drawings, wherein the protruding portion 112 of the retention member 110 extends between the side opposite portions of the U-shaped fuse wire 140 and engages the middle portion of the U-shaped fuse wire 140. In the example shown, the protruding portion 112 of the retention member 110 has a slot 113 that receives the fuse wire 140. The slot 113 prevents disengagement of the fuse wire 140 from the retention member 110. A suitably arranged slot or groove can be employed for engaging the fuse wire 140 with other arrangements of the retention member 110 or its protruding portion 112 (if any).

Figure 7A:
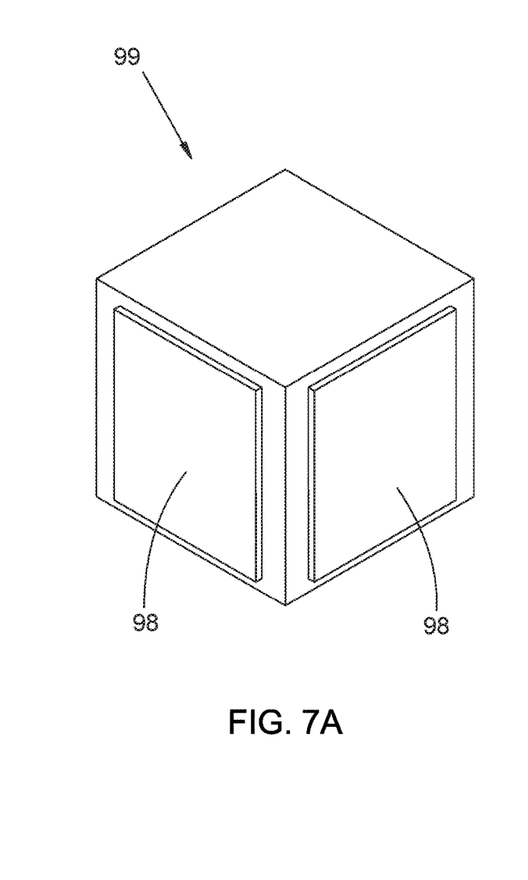
FIGS. 7A and 7B are schematic perspective views of a CubeSat unit with deployable components in non-deployed and deployed arrangements, respectively.
Figure 7B:
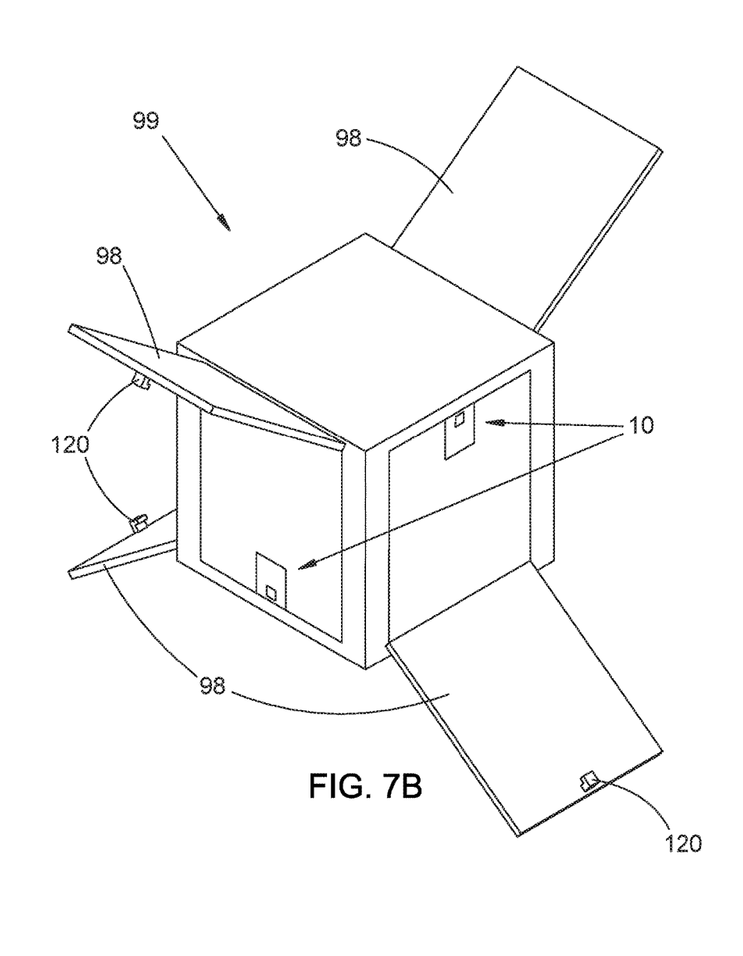

A common use of the release apparatus disclosed herein is to hold down a deployable component of a satellite in a non-deployed arrangement, e.g., during launch, flight maneuvers, orbital insertion, or other situations in which such a non-deployed arrangement might be necessary or desirable. Examples of such deployable satellite components can include one or more of, e.g., solar panels, solar sails, antennae, solar shades, and so forth. It is often the case that the deployable component is biased so that, upon release, it moves from the non-deployed arrangement to a deployed arrangement in response to the deployment bias force. The deployable component is attached to the release member 120 of the hold-down release apparatus 10. Prior to release, with the release member 120 held in the retained position by the retention member 110, the attachment to the release member 120 holds the deployable component in its non-deployed arrangement against the deployment bias force. Upon activation of the release apparatus 10 (by flow of the electrical actuation current through the fuse wire 140), the fuse wire 140 breaks, the retention member 110 moves to the release position in response to the bias force exerted by the bias members 130, the release member 120 is allowed to move out of the housing 105, and the deployable component moves to its deployed configuration (taking the release member 120 along with it) in response to the deployment bias force. In one specific example illustrated schematically in FIGS. 7A and 7B, solar panels 98 of a CubeSat unit 99 can be held by the hold-down release apparatus 10 (by attachment to the release member 120 while it is held in the retained position by the retention member 110; FIG. 7A) in a folded, non-deployed arrangement against a deployment bias force (provided by, e.g., spring-loaded hinges in the folded solar panels). When deployment (i.e., unfolding) of the solar panels 98 is desired, the electrical actuation current is sent through the fuse wire 140, which breaks. The broken fuse wire 140 allows the retention member 110 to move to the release position, which in turn allows the release member 120 to leave the housing, pulled out by the deployment bias force on the solar panels 98. The solar panels 98 then proceed to unfold in response to the deployment bias force and move to the deployed arrangement (FIG. 7B).

The inventive arrangement of the release apparatus 10 disclosed herein is particularly amenable to miniaturization, and is particularly well-suited for use in a so-called CubeSat. CubeSat units are a set standardized external form factors employed for making small, inexpensive satellites, often using off-the-shelf commercial components. Size, weight, power or current requirements, and cost are important limiting factors for any components incorporated into a CubeSat, including a hold-down release apparatus.

Accordingly, the release apparatus 10 can be made quite small. In some examples, the external dimensions of the housing 105 are less than about 2.0 cm by about 3.0 cm by about 0.7 cm; in one example the external dimensions are about 1.9 cm by about 2.9 cm by about 0.6 cm. It may be desirable in some examples to limit the size of the housing 105 so that it occupies less than about 4 cm$^3$ or less than about 5 cm$^3$; in one example the housing occupies about 3.3 cm$^3$. In some examples, the fuse wire 140 is stainless steel less than about 0.02 cm thick; in one example, the fuse wire is stainless steel about 0.013 cm thick. In some examples, the electrical actuation current can be less than about 2 A or less than about 3 A; in one example, the electrical actuation current is about 2 A. The U-shaped arrangement of the fuse wire 140 effectively doubles its break strength, enabling a thinner wire to be used and requiring a smaller actuation current to break it.

The release apparatus 10 can be made by (A) inserting the release member 120 into the housing 105 in the retained position; (B) inserting the retention member 110 and the one or more bias members 130 into the housing 105, arranging the retention member 110 to be movable by reciprocal motion between the retention position and the release position, and arranging the one or more bias members 130 to exert the bias force to bias the retention member 110 toward the release position; (C) arranging the fuse wire 140 within the housing 105 to (i) obstruct movement of the retention member 110 from the retention position to the release position and (ii) hold the retention member 110 in the retention position against the bias force; and (D) connecting a first end of the fuse wire 140 to a source of the electrical actuation current. Further steps can include attaching the housing 105 to a body of a satellite and attaching a deployable component of the satellite to the release member 102. As noted above, in some examples the satellite is a CubeSat unit.

In a specific example arranged as shown in the drawings, the coil springs 130 are positioned on corresponding guide rods 116 of the retention member 110. After inserting the release member 120 into the housing 105 in the retained position, the retention member 110 is inserted into the housing 105 as well. The external dimension of the housing are about 1.9 cm by about 2.9 cm by about 0.6 cm. The fuse wire 140 (about 0.013 cm thick) is wound once around corresponding gold-plated contact portions of the wires 142/144 and resistance welded. The wires 142/144 are positioned within corresponding grooves or slots 146 of the insulating insert 145. The retention member 110 is pushed into the retention position against the bias force of the springs 130, and held there, while the insert 145, carrying the wires 142/144 and the fuse wire 140, is inserted into the housing 105, with the fuse wire 140 sliding into the slot 113 at the end of the protruding portion 112 of the retention member 110. The force required to hold the retention member 110 in the retention position against the bias force of the springs 130 is about 6 pounds. The retention member 110 is then released, but obstruction by the fuse wire 140 holds the retention member 110 in the retention position against the bias force of the springs 130. The insert 145 can include a channel 147 for receiving the protruding portion 112 of the retention member 110; such an arrangement serves to at least partly guide or constrain the reciprocating motion of the retention member 110 within the housing 105. The cover 106 is then attached to the housing 105 to enclose the retention member 110, the springs 130, the insert 145, the contact portions of the wires 142/144, and the fuse wire 140. The housing 105 can then be attached to a CubeSat, and a deployable component can be attached to the release member 120 to be held in the non-deployed position. This particular example can hold down and then release loads of up to about 20 pounds (component substantially perpendicular to the reciprocating motion of the retention member 110). In the specific example, an actuation current of about 2 A flowing through the fuse wire 140 causes the fuse wire 140 to break. The retention member 110 moves to the release position in response to the bias force of the springs 130, and the deployment bias force exerted by or on the deployable component causes the release member 120 to move out of the housing 105. The deployable component continues to move from its non-deployed position until it reaches its deployed position, taking the attached release member 120 along with it.

If activation of the release apparatus 10 by the electrical actuation current occurs after the satellite has been launched, then the release apparatus 10 has reached the end of its useful life. However, deployable satellite components and the release apparatus 10 typically undergo extensive pre-launch ground testing, during which the release apparatus 10 is repeatedly activated (with or without being attached to the satellite or the deployable component). It is desirable for the release apparatus to be readily repaired for reuse after such test activation. To accomplish this, (i) the release member 120 is reinserted into the housing 105 in the retained position; (ii) the broken fuse wire 140 is replaced with a new, unbroken fuse wire 140 that is connected to the source of the electrical actuation current; and (iii) the new fuse wire 140 is arranged within the housing 105 to obstruct movement of the retention member 110 from the retention position to the release position and to hold the retention member 110 in the retention position against the bias force.

In the specific example shown, after removing the cover from the housing 105, the insert 145 is removed from the housing 105. The broken fuse wire 140 is replaced with a new, unbroken fuse wire 140. In some examples, only the fuse wire 140 is replaced; in some examples, at least the contact portions of the conductors 142/144 are replaced as well. The conductors 142/144 and the new fuse wire 140 are positioned in the insert 145. After reinserting the release member 120 in the housing 105 in the retained position, the retention member 110 is pushed into the retention position against the bias force of the springs 130, and held there, while the insert 145, carrying the wires 142/144 and the new fuse wire 140, is reinserted into the housing 105. The new fuse wire 140 slides into the slot 113 at the end of the protruding portion 112 of the retention member 110. The retention member 110 is then released, but obstruction by the new fuse wire 140 holds the retention member 110 in the retention position against the bias force of the springs 130. The cover 106 is then reattached to the housing 105 to enclose the retention member 110, the springs 130, the insert 145, the contact portions of the wires 142/144, and the new fuse wire 140.

In addition to the preceding, the following examples fall within the scope of the present disclosure or appended claims:

Example 1

A hold-down release apparatus comprising a housing, a reciprocating retention member, a release member, one or more bias members, and a fuse wire, wherein: (a) the retention member is (i) moveable by reciprocating motion within the housing between a retention position and a release position and (ii) biased toward the release position by a bias force exerted by the one or more bias members; (b) with the retention member in the release position, the release member is moveable from a retained position at least partly within the housing to an exterior space outside the housing; (c) with the retention member in the retention position, the retention member obstructs movement of the release member from the retained position to the exterior space; (d) the fuse wire is arranged so as to (i) obstruct movement of the retention member from the retention position to the release position and (ii) hold the retention member in the retention position against the bias force; and (e) with an electrical actuation current flowing through the fuse wire, the bias force is sufficient to break the fuse wire, thereby enabling (i) movement of the retention member to the release position in response to the bias force and (ii) movement of the release member from the retained position to the exterior space.

Example 2

The release apparatus of Example 1 wherein (i) a first end of the fuse wire is connected to a first electrical conductor connected to a source of the electrical actuation current, (ii) the first electrical conductor is insulated electrically from the housing, and (iii) with the retention member held in the retention position by the fuse wire, the fuse wire is electrically insulated from the retention member or contacts only an electrically insulated portion of the retention member.

Example 3

The release apparatus of Example 2 wherein (i) a second end of the fuse wire is connected to a second electrical conductor connected to the source of the electrical actuation current, and (ii) the second electrical conductor is electrically insulated from the housing.

Example 4

The release apparatus of Example 3 further comprising an electrically insulating insert positioned within the housing and arranged (i) to hold in respective positions the first and second electrical conductors and the fuse wire within the housing, and (ii) to insulate electrically the first and second electrical conductors and the fuse wire from the housing.

Example 5

The release apparatus of any one of Examples 3 or 4 wherein (i) the first end of the fuse wire is wound around a contact portion of the first electrical conductor and welded or soldered to the contact portion of the first electrical conductor, and (ii) the second end of the fuse wire is wound around a contact portion of the second electrical conductor and welded or soldered to the contact portion of the second electrical conductor.

Example 6

The release apparatus of any one of Examples 1 through 5 wherein, with the retention member held in the retention position by the fuse wire, the fuse wire is received in a slot or groove in the retention member.

Example 7

The release apparatus of any one of Examples 1 through 6 wherein, with the retention member held in the retention position by the fuse wire, the fuse wire is arranged in a "U" shape and a protruding portion of the retention member extends between opposite side portions of the U-shaped fuse wire with an end of the protruding portion positioned against a central portion of the U-shaped fuse wire.

Example 8

The release apparatus of any one of Examples 1 through 7 wherein reciprocating motion of the retention member is substantially perpendicular to movement of the release member from the retained position to the exterior space.

Example 9

The release apparatus of Example 8 wherein, with the retention member in the retention position, an engagement surface of the retention member is positioned against an engagement surface of the release member and obstructs movement of the release member from the retained position to the exterior space, and movement of the retention member to the release position causes the engagement surfaces to slide across one another.

Example 10

The release apparatus of Example 9 wherein a coefficient of static friction between the engagement surfaces is less than about 0.10.

Example 11

The release apparatus of any one of Examples 1 through 10 wherein the one or more bias members include one or more compression springs arranged so as to push the retention member toward the release position.

Example 12

The release apparatus of any one of Examples 1 through 11 wherein the fuse wire comprises stainless steel.

Example 13

The release apparatus of any one of Examples 1 through 12 wherein the electrical actuation current is less than about 2.0 A.

Example 14

The release apparatus of any one of Examples 1 through 13 wherein the housing occupies less than about 4 cm$^3$.

Example 15

The release apparatus of any one of Examples 1 through 14 wherein (1) the housing is attached to a body of a satellite, (2) the release member is attached to a deployable component of the satellite, (3) with the release member held in the retained position by the retention member in the retention position, the release member holds the deployable component in a non-deployed arrangement, and (4) with the retention member in the release position, movement of the release member from the retained position to the exterior space enables movement of the deployed component from the non-deployed arrangement into a deployed arrangement.

Example 16

The release apparatus of Example 15 wherein the satellite comprises a CubeSat unit.

Example 17

A method for using the release apparatus of any one of Examples 15 or 16, the method comprising flowing the actuation current through the fuse wire so as to cause the bias force to break the fuse wire, thereby enabling (i) movement of the retention member to the release position in response to the bias force, (ii) movement of the release member from the retained position to the exterior space, and (iii) movement of the deployed component from the non-deployed arrangement into the deployed arrangement.

Example 18

A method for making the release apparatus of any one of Examples 1 through 16, the method comprising: (A) inserting the release member into the housing in the retained position; (B) inserting the retention member and the one or more bias members into the housing, arranging the retention member to be movable by reciprocal motion between the retention position and the release position, and arranging the one or more bias members to exert the bias force to bias the retention member toward the release position; (C) arranging the fuse wire within the housing to (i) obstruct movement of the retention member from the retention position to the release position and (ii) hold the retention member in the retention position against the bias force; and (D) connecting a first end of the fuse wire to a source of the electrical actuation current.

Example 19

The method of Example 18 further comprising attaching the housing to a body of a satellite and attaching a deployable component of the satellite to the release member, wherein (1) with the release member held in the retained position by the retention member in the retention position, the release member holds the deployable component in a non-deployed arrangement, and (2) with the retention member in the release position, movement of the release member from the retained position to the exterior space enables movement of the deployed component from the non-deployed arrangement into a deployed arrangement.

Example 20

The method of any one of Examples 18 or 19 further comprising (E) flowing the actuation current through the fuse wire so as to cause the bias force to break the fuse wire, thereby enabling (i) movement of the retention member to the release position in response to the bias force and (ii) movement of the release member from the retained position to the exterior space.

Example 21

The method of Example 20 further comprising, after the fuse wire breaks: (F) reinserting the release member into the housing in the retained position; (G) replacing the fuse wire with a new, unbroken fuse wire and connecting the new fuse wire to the source of the electrical actuation current; and (H) arranging the new fuse wire within the housing to (i) obstruct movement of the retention member from the retention position to the release position and (ii) hold the retention member in the retention position against the bias force.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

In the appended claims, any labelling of elements, steps, limitations, or other portions of a claim (e.g., first, second, etc., (a), (b), (c), etc., or (i), (ii), (iii), etc.) is only for purposes of clarity, and shall not be construed as implying any sort of ordering or precedence of the claim portions so labelled. If any such ordering or precedence is intended, it will be explicitly recited in the claim or, in some instances, it will be implicit or inherent based on the specific content of the claim. In the appended claims, if the provisions of 35

USC §112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A hold-down release apparatus comprising a housing, a reciprocating retention member, a release member, one or more bias members, and a fuse wire, wherein:
   (a) the retention member is (i) moveable by reciprocating motion within the housing between a retention position and a release position and (ii) biased toward the release position by a bias force exerted by the one or more bias members;
   (b) with the retention member in the release position, the release member is moveable from a retained position at least partly within the housing to an exterior space outside the housing;
   (c) with the retention member in the retention position, the retention member obstructs movement of the release member from the retained position to the exterior space;
   (d) the fuse wire is arranged so as to (i) obstruct movement of the retention member from the retention position to the release position and (ii) hold the retention member in the retention position against the bias force; and
   (e) with an electrical actuation current flowing through the fuse wire, the bias force is sufficient to break the fuse wire, thereby enabling (i) movement of the retention member to the release position in response to the bias force and (ii) movement of the release member from the retained position to the exterior space.

2. The release apparatus of claim 1 wherein (i) a first end of the fuse wire is connected to a first electrical conductor connected to a source of the electrical actuation current, (ii) the first electrical conductor is insulated electrically from the housing, and (iii) with the retention member held in the retention position by the fuse wire, the fuse wire is electrically insulated from the retention member or contacts only an electrically insulated portion of the retention member.

3. The release apparatus of claim 2 wherein (i) a second end of the fuse wire is connected to a second electrical conductor connected to the source of the electrical actuation current, and (ii) the second electrical conductor is electrically insulated from the housing.

4. The release apparatus of claim 3 further comprising an electrically insulating insert positioned within the housing and arranged (i) to hold in respective positions the first and second electrical conductors and the fuse wire within the housing, and (ii) to insulate electrically the first and second electrical conductors and the fuse wire from the housing.

5. The release apparatus of claim 3 wherein (i) the first end of the fuse wire is wound around a contact portion of the first electrical conductor and welded or soldered to the contact portion of the first electrical conductor, and (ii) the second end of the fuse wire is wound around a contact portion of the second electrical conductor and welded or soldered to the contact portion of the second electrical conductor.

6. The release apparatus of claim 1 wherein, with the retention member held in the retention position by the fuse wire, the fuse wire is received in a slot or groove in the retention member.

7. The release apparatus of claim 1 wherein, with the retention member held in the retention position by the fuse wire, the fuse wire is arranged in a "U" shape and a protruding portion of the retention member extends between opposite side portions of the U-shaped fuse wire with an end of the protruding portion positioned against a central portion of the U-shaped fuse wire.

8. The release apparatus of claim 1 wherein reciprocating motion of the retention member is substantially perpendicular to movement of the release member from the retained position to the exterior space.

9. The release apparatus of claim 8 wherein, with the retention member in the retention position, an engagement surface of the retention member is positioned against an engagement surface of the release member and obstructs movement of the release member from the retained position to the exterior space, and movement of the retention member to the release position causes the engagement surfaces to slide across one another.

10. The release apparatus of claim 9 wherein a coefficient of static friction between the engagement surfaces is less than about 0.10.

11. The release apparatus of claim 1 wherein the one or more bias members include one or more compression springs arranged so as to push the retention member toward the release position.

12. The release apparatus of claim 1 wherein the fuse wire comprises stainless steel.

13. The release apparatus of claim 1 wherein the electrical actuation current is less than about 2.0 A.

14. The release apparatus of claim 1 wherein (1) the housing is attached to a body of a satellite, (2) the release member is attached to a deployable component of the satellite, (3) with the release member held in the retained position by the retention member in the retention position, the release member holds the deployable component in a non-deployed arrangement, and (4) with the retention member in the release position, movement of the release member from the retained position to the exterior space enables movement of the deployed component from the non-deployed arrangement into a deployed arrangement.

15. The release apparatus of claim 14 wherein the satellite comprises a CubeSat unit.

16. The release apparatus of claim 14 wherein the housing occupies less than about 4 $cm^3$.

17. A method for using the release apparatus of claim 14, the method comprising flowing the actuation current through the fuse wire so as to cause the bias force to break the fuse wire, thereby enabling (i) movement of the retention member to the release position in response to the bias force, (ii) movement of the release member from the retained position to the exterior space, and (iii) movement of the deployed component from the non-deployed arrangement into the deployed arrangement.

18. The method of claim 17 wherein the satellite comprises a CubeSat unit.

19. A method for making the release apparatus of claim 1, the method comprising:
   (A) inserting the release member into the housing in the retained position;
   (B) inserting the retention member and the one or more bias members into the housing, arranging the retention member to be movable by reciprocal motion between the retention position and the release position, and arranging the one or more bias members to exert the bias force to bias the retention member toward the release position;
   (C) arranging the fuse wire within the housing to (i) obstruct movement of the retention member from the retention position to the release position and (ii) hold the retention member in the retention position against the bias force; and
   (D) connecting a first end of the fuse wire to a source of the electrical actuation current.

20. The method of claim 19 further comprising attaching the housing to a body of a satellite and attaching a deployable component of the satellite to the release member, wherein (1) with the release member held in the retained position by the retention member in the retention position, the release member holds the deployable component in a non-deployed arrangement, and (2) with the retention member in the release position, movement of the release member from the retained position to the exterior space enables movement of the deployed component from the non-deployed arrangement into a deployed arrangement.

21. The method of claim 20 wherein the satellite comprises a CubeSat unit.

22. The method of claim 19 further comprising (E) flowing the actuation current through the fuse wire so as to cause the bias force to break the fuse wire, thereby enabling (i) movement of the retention member to the release position in response to the bias force and (ii) movement of the release member from the retained position to the exterior space.

23. The method of claim 22 further comprising, after the fuse wire breaks:
   (F) reinserting the release member into the housing in the retained position;
   (G) replacing the fuse wire with a new, unbroken fuse wire and connecting the new fuse wire to the source of the electrical actuation current; and
   (H) arranging the new fuse wire within the housing to (i) obstruct movement of the retention member from the retention position to the release position and (ii) hold the retention member in the retention position against the bias force.

* * * * *